US007991869B2

(12) United States Patent
Bonjour et al.

(10) Patent No.: US 7,991,869 B2
(45) Date of Patent: Aug. 2, 2011

(54) METHOD FOR MANAGING DECISIONS, METHOD FOR CONSTRUCTING A DECISION TREE, CENTRAL MANAGER, INTERMEDIATE MANAGER, TERMINAL AND CORRESPONDING COMPUTER PROGRAM PRODUCTS

(75) Inventors: Servane Bonjour, Acigne (FR); Christophe Dousson, Lannion (FR); Mai Trang Thi Nguyen, Paris (FR)

(73) Assignee: France Telecom, Paris (FR)

( * ) Notice: Subject to any disclaimer, the term of this patent is extended or adjusted under 35 U.S.C. 154(b) by 555 days.

(21) Appl. No.: 11/910,695

(22) PCT Filed: Mar. 30, 2006

(86) PCT No.: PCT/EP2006/061176
§ 371 (c)(1),
(2), (4) Date: Jun. 16, 2008

(87) PCT Pub. No.: WO2006/106067
PCT Pub. Date: Oct. 12, 2006

(65) Prior Publication Data
US 2009/0119392 A1    May 7, 2009

(30) Foreign Application Priority Data

Apr. 4, 2005  (FR) ...................................... 05 03328

(51) Int. Cl.
*G06F 15/173* (2006.01)
*H04W 4/00* (2009.01)
*H04W 36/00* (2009.01)

(52) U.S. Cl. ........ 709/223; 709/224; 370/331; 370/332; 455/436; 455/437

(58) Field of Classification Search .................. 709/226, 709/232–237, 248, 253, 223, 224, 252; 726/22–25; 370/331, 332; 455/433–444
See application file for complete search history.

(56) References Cited

U.S. PATENT DOCUMENTS

| 6,591,257 | B1 * | 7/2003 | Martinka et al. ................. 706/46 |
| 6,609,205 | B1 * | 8/2003 | Bernhard et al. ................ 726/22 |
| 6,704,719 | B1 * | 3/2004 | Ericson ........................... 706/48 |

(Continued)

FOREIGN PATENT DOCUMENTS

CN    1 384 639    12/2002

(Continued)

OTHER PUBLICATIONS

"Hierarchical Mobility Controlled by the Network." (Y. Khouaja, K. Guillouard, P. Bertin and JM. Bonnin). "Multiaccess, Mobiility and Teletraffic for Wireless Communications." Kluwer Academic Publishers, 2002.

(Continued)

*Primary Examiner* — Yemane Mesfin
(74) *Attorney, Agent, or Firm* — David D. Brush; Westman, Champlin & Kelly, P.A.

(57) ABSTRACT

A method is provided for managing decisions between a central manager and at least one terminal in an architecture of networks distributed and prioritized according to N levels, with $N \geq 2$. The central manager is included in a level of rank N. The terminal is included in a level of rank 1. The method includes a step of distributing a decision tree constructed by the central manager and supported by the architecture.

24 Claims, 7 Drawing Sheets

U.S. PATENT DOCUMENTS

| | | | |
|---|---|---|---|
| 6,996,843 B1 * | 2/2006 | Moran | 726/23 |
| 2002/0078431 A1 | 6/2002 | Reps | 717/100 |
| 2003/0023711 A1 | 1/2003 | Parmar et al. | 709/223 |

FOREIGN PATENT DOCUMENTS

| | | |
|---|---|---|
| WO | WO 03/049381 | 6/2003 |

OTHER PUBLICATIONS

"A framework for context-aware handover decisions." (C. Prehofer, N. Nafisi, Q. Wei). PIMRC 2003, Beijing, China, Oct. 7, 2003.

French Search Report from counterpart foreign application No. FR 05/03328 filed Nov. 24, 2005.

International Search Report from counterpart foreign application No. PCT/EP2006/061176 filed Mar. 30, 2006.

\* cited by examiner

METHOD FOR MANAGING DECISIONS, METHOD FOR CONSTRUCTING A DECISION TREE, CENTRAL MANAGER, INTERMEDIATE MANAGER, TERMINAL AND CORRESPONDING COMPUTER PROGRAM PRODUCTS

CROSS-REFERENCE TO RELATED APPLICATION

This Application is a Section 371 National Stage Application of International Application No. PCT/EP2006/061176, filed Mar. 30, 2006 and published as WO 2006/106067 A1 on Oct. 12, 2006, not in English.

FIELD OF THE DISCLOSURE

The field of the disclosure is that of decision trees.

More specifically, the disclosure pertains to a method for the management of decisions between a central manager and at least one terminal within a network architecture distributed and hierarchically organized in N levels with $N \geq 2$. It is assumed that the central manager is included in a level of rank N and that the terminals are included in a level of rank 1.

Conventionally, a decision tree is built on the basis of a set of rules defining a decision policy and a set of variables comprising a subset of explanatory variables (measurable variables) and a subset of target variables (variables to be deduced).

The disclosure can be applied especially but not exclusively to an architecture of networks within which a network operator wishes to implement a decision policy such as for example a decision policy relating to mobility, security or again quality of service.

In the particular case of a decision policy on mobility, it is the object of the disclosure to enable a network operator to apply inter-cell handover decision policies based on rules that the operator defines himself. The disclosure can be applied in all types of data networks and is independent of the technology of the access networks (namely GPRS or "General Packet Radio Service", UMTS or "Universal Mobile Telecommunication System", WLAN or "Wireless Local Area Network", Ethernet etc.). These rules take account of different parameters related to the operator, the mobile terminal, the access networks and the user.

BACKGROUND

The drawbacks of the prior art shall now be presented in the light of the particular case of a known technique for applying a decision policy on mobility within an architecture of packet mode transmission networks.

A mobility manager applying inter-cell handover control by the network is presented in the document "Hierarchical Mobility Controlled by the Network" by Y. Khouaja, K. Guillouard, P. Bertin and J M. Bonnin in "Multiaccess, Mobility and Teletraffic for Wireless Communications", Kluwer Academic Publishers, 2002.

This document defines a mobility manager who has the capacity to initiate and guide the execution of inter-cell handover, using information transmitted by the operator, the network and the mobile nodes. This mobility manager is situated in a cell network and enables the choosing of the target cells according to radio data (measurements sent back by the mobile units), network data (load, type of traffic, quality of service) and operator data (subscriber profiles, network parameters, activation thresholds, state of operation of access points). Each mobility manager manages a set of radio cells (i.e. a set of access points). The working of the mobility manager is described here below. The mobility manager (GM) transmits a list of the neighboring access points (PA) to the mobile node (mobile terminal). The mobile node (NM) transmits the measurements of quality of the radio link to the mobility manager. The mobile node asks the mobility manager to change the access point without specifying a new target access point. The mobility manager selects the target access point by consulting its database (BD). This database contains various pieces of information liable to assist decision-making in inter-cell handover. The mobility manager manages the change of access point in transmitting the data packets intended for the mobile node simultaneously to the two access points involved in the inter-cell handover, as soon as the mobility manager has knowledge of the imminent execution of the inter-cell handover. This duplication of data limits data packet losses.

The mobility manager described here above is used to apply mobility management based on rules that the network operator defines. This prior-art technique however has several drawbacks.

First of all, the centralization of a mobility manager has the drawback of making information go back by one or more hierarchical levels to the central point, thus increasing the application time. Furthermore, the inter-cell handover decisions are made for all the terminals that have to move. This makes the application time proportional to the number of terminals to be moved. With a centralized manager, the number of terminals is very great and therefore the application time too. Finally, the time taken to go through a decision tree is proportional to the number of pieces of information contained in the tree. Now, in a centralized manager, the number of pieces of information to be taken into account is very great.

Again, for the distribution of the rules, the defining of a deduction system (expert system) at each hierarchical level may be envisaged. However, this approach can not be used to take account of the decision rules in which the different categories of parameters (local or global) are mixed. In this case, the rules can contain only the local parameters. This approach requires the user to write rules that work only at one level and to distribute them by hand thereafter. In other words, the hierarchical structure of the management of the policy influences the writing of the rules of policy (in particular, when there is a change in hierarchical structure without a change in policy, the rules have to be rewritten). Furthermore, no means of decision tree distribution is described.

SUMMARY

An embodiment of the invention is directed to a method of management of decisions between a central manager and at least one terminal within a network architecture distributed and hierarchically organized in N levels with $N \geq 2$, the central manager being included in a rank N level, said at least one terminal being included in a rank 1 level. According to an embodiment of the invention, this method comprises a step of distribution of a decision tree built by the central manager and relying on said architecture, the step of distribution of the decision tree itself comprising the following steps, for a given terminal:

from the decision tree, called a rank N tree, the central manager creates a simplified tree of rank N−1;
if N=2, the central manager transmits the simplified tree of rank N−1 to the given terminal so that the given terminal takes a decision on the basis of the simplified tree of rank N−1 and executes it;

if $N \geqq 3$, the following steps are performed, after k has been initialized at N−1:

a) the central manager transmits the simplified tree of rank k to the intermediate manager of rank k included in the rank k level;

b) the intermediate manager of rank k creates a simplified tree of rank k−1 from the simplified tree of rank k;

c) if $k \geqq 3$, the intermediate manager of rank k transmits the simplified tree of rank k−1 to an intermediate manager of rank k−1 included in the level of rank k−1 and the process returns to the step b) after having decremented k by one unit;

if k=2, the intermediate manager of rank k transmits the simplified tree of rank k−1 to the given terminal, so that the given terminal takes a decision on the basis of the simplified tree of rank k−1 and executes it.

It must be noted that a simplified tree may have only one leaf.

The technique of an embodiment of the invention performs better than the known technique based on the use of a centralized manager. Indeed, the technique of an embodiment of the invention does not call for information to be sent back by one or more hierarchical levels to a central manager since each manager of a level of given rank processes information available at the level of this given rank.

Furthermore, the total processing time of the tree (until a leaf has been reached) is reduced due to the fact that the successively involved managers use ever less complex trees (a rank k−1 tree being obtained by reduction of a rank k tree).

Advantageously if, in the step b), the simplified tree of rank k−1 is reduced to a leaf node, then the step c) is replaced by the following step:

c') the intermediate manager of rank k takes a decision and transmits it to the given terminal so that the given terminal executes it.

In a preferred embodiment, the transmission of a simplified tree of rank j−1 by a rank j manager with $j \in \{N \ldots 2\}$, is based on an overall simplified tree structure comprising a chained list of elementary structures each defining a given node of the simplified tree of rank j−1 and each comprising:

a flag indicating whether, for the simplified tree of rank j−1, the given node is a root node, an intermediate node or a decision node an identifier of the elementary structure;

if the given node is a root node, an intermediate mode or a decision node that is not a leaf node:

an explanatory variable;

an operation to be performed on the explanatory variable, constituting a test on the value of the explanatory variable;

for each possible value of the test, a "following elementary structure" field containing the identifer of the elementary structure defining the following node of the simplified tree of rank j−1;

if the given node is a decision node that is the leaf node:

at least one target variable;

for each target variable, an operation on the target variable constituting the supply of a value of the target variable;

for each target variable, a "following elementary structure" containing an end indicator.

Thus, when it goes through the simplified tree of rank j−1 which it has received, the rank j−1 manager knows that each decision node which is not a leaf of the simplified tree of rank j−1 is root node of a simplified tree of rank j−2 to be transmitted.

Advantageously, the decision tree comprises, when it is gone through from a root node toward leaf nodes, a sequence of N sets of nodes, a set of nodes of rank i, $i \in \{N \ldots 1\}$, relying on explanatory variables available at the level of rank i. The creation by a rank j manager of a simplified tree of rank j−1 on from a rank j tree, with $j \in \{N \ldots 2\}$, is done in taking account of at least one piece of information that the rank j manager possesses on at least one explanatory variable available at the rank j level. When it reaches a node of the set of rank j−1 nodes in going through the rank j tree, the rank j manager transfers control to a rank j−1 manager so that the rank j−1 manager travels through the simplified tree of rank j−1.

According to a characteristic advantage, the transmission of a simplified tree of rank j−1 to a rank j−1 manager, with $j \in \{N \ldots 2\}$, is done by the rank j manager in a preliminary step of distribution of all the rank j−1 trees possible between all the rank j−1 managers.

In this case, all the simplified trees are distributed a priori once and for all and then all that is done is to travel through them in changing the manager at the time of the changes in level of the nodes.

According to an advantageous variant, the decision tree comprises, the decision tree comprises, when it is gone through from a root node toward leaf nodes, a sequence of N sets of nodes, a set of nodes of rank i, $i \in \{N \ldots 1\}$, relying on explanatory variables available at the level of rank i. Furthermore, the transmission of a simplified tree of rank j−1 to a rank j−1 manager, with $j \in \{N \ldots 2\}$, is done by the rank j manager only after the rank j manager has arrived, in going through a rank j tree, on one node of a set of rank j−1 nodes.

Unlike in the previous case, the simplified trees are not distributed on a a priori basis but only when necessary, during processing, i.e. whenever a rank j manager reaches a rank j−1 node (and at this point in time, sends a simplified tree of rank j−1 to one of the rank j−1 managers).

Advantageously, the decision tree contains a decision policy belonging to the group comprising:

decision policies on mobility of said at least one terminal within the network architecture;

decision policies on quality of service for said at least one terminal within the network architecture; and decision policies on security for said at least one terminal within the network structure.

In this particular context of a decision on mobility, an embodiment of the invention relates to the distribution of a decision tree relying on a distributed architecture of mobility management. In the particular case where N=3, the structure of the tree is decided by the central mobility manager (managers of rank 3 level) and it takes account of the information that it possesses to create simplified trees which it distributes to the access managers (managers of rank 2). These managers do the same work to distribute simplified trees to the terminals (rank 1 level) that will apply the information that they possess to implement the final mobility decision. All the data entering the mobility policy is taken into account locally and does not need to be sent back to the central mobility manager. Only information on the location of the mobile terminals is sent back to the central mobility manager. This enables the distribution of only trees needed by the managers of the lower levels (sending the trees solely for the terminals located in an access network). This also optimizes the total time of inter-cell handover because the parameters are evaluated locally and the decision is made only for the terminals of only one access network at a time.

An embodiment of the invention also relates to a method for the building of a decision tree adapted to the implementation of the above-mentioned method for the management of decisions between a central manager and at least one terminal, the decision tree being built on the basis of a set of rules defining a decision policy to be applied within an architecture distributed and hierarchically organized in N levels, with $N \geq 2$, and a set of variables comprising a subset of explanatory variables, the central manager being included in a rank N level, said at least one terminal being included in a rank 1 level, the method comprising a step for the choice of an explanatory variable so as to create a new node of the tree relying on said explanatory variable, the step of choice being iterated starting from a root node and going towards leaf nodes, the choice made at each new iteration being made from among the explanatory variables, called free explanatory variables, not already chosen during a preceding iteration. According to an embodiment of the invention, at each iteration of the step of choice, an available explanatory variable is chosen at the level occupying the highest rank among the ranks of the levels at which the free explanatory variables are available, so that the decision tree comprises, when it is gone through from the root node to the leaf nodes, a sequence of N sets of nodes, a set of nodes of rank i, $i \in \{N \ldots 1\}$, relying on explanatory variables available at the rank i level.

The general principle of an embodiment of the invention therefore consists of the automatic conversion of the set of rules of the decision policy into a distributable decision tree, through an adapted choice of the explanatory variables on which the nodes of the decision tree rely. More specifically, taking as a basis the fact that each of the explanatory variables is available at one of the levels of the architecture (from the most comprehensive level to the most local level), an embodiment of the invention proposes to group together the nodes of the decision tree into sets of nodes hierarchically organized as a function of the hierarchy of the levels of the architecture. Thus, all the nodes of a same set of nodes rely on explanatory variables available at the same level of the architecture. Furthermore, the nodes closest to the root node rely on explanatory variables available at the more comprehensive level. The further they are from the root node, the more the nodes rely on explanatory variables available at levels which are themselves increasingly distant from the more general level. In other words, an embodiment of the invention can be used to revise the rules so as to obtain a distributable decision tree whereas, in principle, the rules mix both types of parameters and are therefore not distributable as is.

The fact that the decision tree is distributable enables a distribution of the decision tree during the implementation of the above-mentioned method of decision management (method for the execution of a decision policy contained in this tree).

Advantageously, the decision policy belongs to the group comprising:
  decision policies on mobility of said at least one terminal within the network architecture;
  decision policies on quality of service for said at least one terminal within the network architecture; and
  decision policies on security for said at least one terminal within the network structure.

Advantageously, the decision policy is a decision policy on mobility of said at least one terminal within the network architecture, and the architecture is hierarchically organized according to the following three levels:
  a rank 3 level comprising a core network;
  a rank 2 level comprising at least two access networks each forming a part of the rank 2 level;
  a rank 1 level comprising a plurality of terminals each forming a part of the rank 1 level.

Advantageously, the subset of explanatory variables comprises:
  at least one variable available at the rank 3 level and belonging to the group comprising:
    a variable defining the type of subscription associated with a terminal;
    a variable defining the access network to which a terminal is connected;
  at least one variable available at the rank 2 level for each access network and belonging to the group comprising:
    a variable defining the load of a point of access to the access network.
  at least one variable available at the rank 1 level for each terminal connected to a given access network, and belonging to the group comprising:
    for each access network, a variable defining the availability of the access network;
    a variable defining the quality of service required by the terminal;
    a variable defining the quality of service offered to the terminal; and
    a variable defining the quality of surface offered by the given access network.

Preferably, the method of building of a decision tree according to an embodiment of the invention is implemented in the central manager.

An embodiment of the invention also relates to a method of partial processing of a decision tree by a central manager, in the context of the management of decisions between a central manager and at least one terminal within a network architecture distributed and hierarchically organized in N levels with $N \geq 2$, the central manager being included in a level of rank N, said at least one terminal being included in a rank 1 level.

According to an embodiment of the invention, the central manager performs the following steps, for a given terminal:
  from the decision tree, called a rank N tree, it creates a simplified tree of rank N−1;
  if N=2, it transmits the simplified tree of rank N−1 to the given terminal so that the given terminal takes a decision on the basis of the simplified tree of rank N−1 and executes it;
  if $N \geq 3$, it transmits the simplified tree of rank N−1 to the intermediate manager of rank N−1 included in the rank N−1 level so that the given terminal receives a simplified rank 1 tree via a cascade of intermediate managers comprising at least the intermediate manager of rank N−1.

Thus, the central manager of an embodiment of the invention performs only a part of the complete processing of the decision tree, this complete processing being distributed between the central manager, the terminal and, as the case may be, one or more intermediate managers. This distribution of the complete processing averts the need to send back all the information up to the central manager. Furthermore, the fact that the central manager transmits a simplified tree also simplifies the other parts of the complete processing performed by the terminal and, as the case may be, the intermediate manager or managers.

Advantageously, the central manager performs a preliminary step for building the decision tree from a set of rules defining a decision policy to be applied within said architecture and a set of variables comprising a subset of explanatory variables, the building step comprising a step of choice of an explanatory variable so as to create a new node of the tree relying on said explanatory variable, the step of choice being iterated starting from a root node and going towards leaf nodes, the choice made at each new iteration being made from among the explanatory variables, called free explanatory variables, not already chosen during a preceding iteration. At each iteration of the step of choice, the central manager chooses an explanatory variable available at the level occupying the highest rank among the ranks of the levels at which the free explanatory variables are available, so that the decision tree comprises, when it is gone through from the root node to the leaf nodes, a sequence of N sets of nodes, a set of nodes of rank i, i∈{N . . . 1}, relying on explanatory variables available at the rank i level.

An embodiment of the invention also pertains to a method of partial processing of a decision tree by an intermediate manager of rank m, with m∈{N−1 . . . 2}, in the context of the management of decisions between a central manager and at least one terminal within a network architecture distributed and hierarchically organized hierarchically organized in N levels with N≧3, the central manager being included in a level of rank N, said at least one terminal being included in a rank 1 level. According to an embodiment of the invention, the intermediate manager performs the following steps, for a given terminal:

it receives a simplified tree of rank m;
from the simplified tree of rank m, it creates a simplified tree of rank m−1;
if m=2, it transmits the simplified tree of rank m−1 to the given terminal so that the given terminal takes a decision on the basis of the simplified tree of rank m−1 and executes it;
if m≧3, it transmits the simplified tree of rank m−1 to an intermediate manager of rank m−1 included in the m−1 rank level, so that the given terminal receives a simplified tree of rank 1 via a cascade of intermediate managers comprising at least the intermediate manager of rank m−1.

In the same way as the central manager or the terminal, the intermediate manager of an embodiment of the invention does only a part of a complete processing of the decision tree. The distribution of the complete processing between the different entities (intermediate manager or managers, central manager and terminal) averts the sending back of all the information up to the central manager. Furthermore, the fact that the intermediate manager transmits a simplified tree (which is even more simplified then the simplified tree that it has itself received) also simplifies the other parts of the complete processing performed by the terminal and, as the case may be, the other intermediate manager or managers of a lower rank or lower ranks.

Advantageously, if the simplified tree of rank m−1 is reduced to a leaf node, then the intermediate manager takes a decision and transmits it to the given terminal so that the given terminal executes it.

An embodiment of the invention also relates to a method of partial processing of a decision tree by a terminal, in the context of the management of decisions between a central manager and at least one terminal, within a network architecture distributed and hierarchically organized in N levels with N≧2, the central manager being included in a level of rank N, said terminal being included in a level of rank 1. According to an embodiment of the invention, the terminal performs the following steps: it receives a simplified tree of rank 1 and it takes a decision on the basis of the simplified tree of rank 1 and executes it.

Just as in the case of the central manager or the intermediate manager, the terminal of an embodiment of the invention performs only a part of the complete processing of the decision tree. The distribution of the complete processing between the different entities (intermediate manager or managers, central manager and terminal) averts the sending back of all the information up to the central manager. Furthermore, the fact that the terminal receives a simplified tree also simplifies the part of the complete processing performed by the terminal.

An embodiment of the invention also relates to a computer program product downloadable from a communications network and/or recorded on a computer-readable carrier and/or executable by a processor, for the execution of each of these methods (method of partial processing for decision tree by a central manager, method of partial processing of a decision tree by an intermediate manager of rank m, method of partial processing of a decision tree by a terminal).

An embodiment of the invention also relates to a central manager enabling the partial processing of a decision tree in the context of the management of decisions between a central manager and at least one terminal within a network architecture distributed and hierarchically organized in N levels with N≧2, the central manager being included in a level of rank N, said at least one terminal being included in a level of rank 1.

According to an embodiment of the invention, the central manager comprises:

means of creation, for a given terminal, of a simplified tree of rank N−1 from the decision tree called a tree of rank N;
if N=2, means of transmission of the simplified tree of rank N−1 to the given terminal so that the given terminal takes a decision on the basis of the simplified tree of rank N−1 and executes it;
if N≧3, means of transmission of the simplified tree of rank N−1 to an intermediate manager of rank N−1 included in the rank N−1 level so that the given terminal receives a simplified rank 1 tree via a cascade of intermediate managers comprising at least the intermediate manager of rank N−1.

Advantageously, the central manager comprises means for building a decision tree on the basis of a set of rules defining a decision policy to be applied within said architecture, and a set of variables comprising a subset of explanatory variables. Furthermore, the building means comprise means of choice of an explanatory variable so as to create a new node of the tree relying on said explanatory variable, the means of choice being used iteratively, starting from a root node and going towards leaf nodes, the choice made at each new iteration being made from among the explanatory variables, called free explanatory variables, not already chosen during a preceding iteration. Finally, at each iteration, the means of choice choose an available explanatory variable at the level occupying the highest rank among the ranks of the levels at which the free explanatory variables are available, so that the decision tree comprises, when it is gone through from the root node to the leaf nodes, a sequence of N sets of nodes, a set of nodes of rank i, i∈{N . . . 1}, relying on explanatory variables available at the rank i level.

An embodiment of the invention, furthermore pertains to an intermediate manager of rank m, with m∈{N−1 . . . 2}, enabling the partial processing of a decision tree in the context of the management of decisions between a central manager and at least one terminal within a network architecture distributed and hierarchically organized hierarchically organized in N levels with N≧3, the central manager being included in a level of rank N, said at least one terminal being included in a rank 1 level. According to an embodiment of the invention, the intermediate manager comprises:

means of reception, for a given terminal, of a simplified tree of rank m;
means of creation of a simplified tree of rank m−1 from the simplified tree of rank m;

if m=2, means of transmission of the simplified tree of rank m−1 to the given terminal so that the given terminal takes a decision on the basis of the simplified tree of rank m−1 and executes it;

if m≧3, means of transmission of the simplified tree of rank m−1 to an intermediate manager of rank m−1 included in the m−1 rank level, so that the given terminal receives a simplified tree of rank 1 via a cascade of intermediate managers comprising at least the intermediate manager of rank m−1.

Advantageously, the intermediate manager furthermore comprises:

means of taking a decision, activated if the simplified tree of rank m−1 is reduced to a leaf node; and means of transmission of the decision made to the given terminal, so that the given terminal executes it.

An embodiment of the invention also pertains to a terminal enabling the partial processing of a decision tree in the context of the management of decisions between a central manager and at least said terminal, within a network architecture distributed and hierarchically organized in N levels with N≧2, the central manager being included in a level of rank N, the terminal being included in a level of rank 1. According to an embodiment of the invention, the terminal comprises:

means of reception of a simplified tree of rank 1;

means of taking a decision on the basis of the simplified tree of rank 1; and means of execution of a decision taken.

Other features and advantages shall appear from the following description of a preferred embodiment given by way of an indicative and non-exhaustive example, and from the appended drawings.

DETAILED DESCRIPTION OF ILLUSTRATIVE EMBODIMENTS

Figure 1:
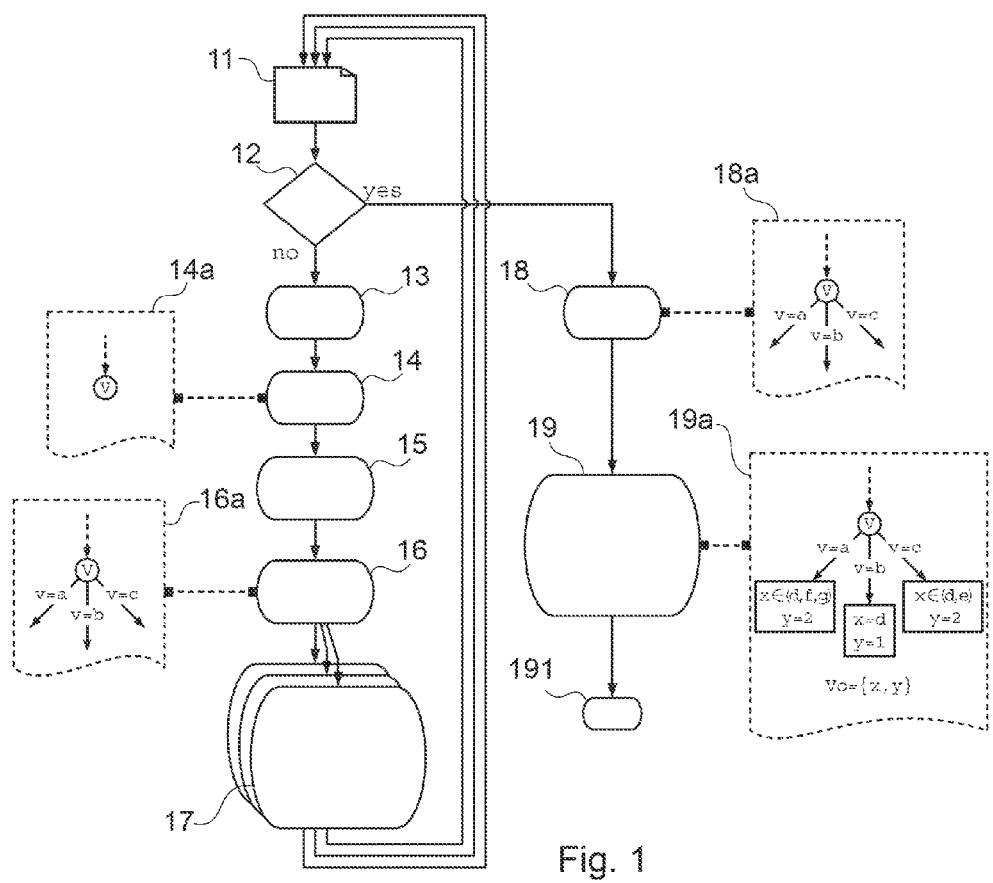
FIG. 1 is a flowchart of a particular embodiment of the method of the invention for the building of a decision tree.

An embodiment of the invention therefore relates to a method for building a decision tree using, firstly, a set of rules defining a decision policy to be implemented within a distributed architecture hierarchically organized in N levels, N≧2, the rank N level being the most comprehensive level of the architecture and, secondly, a set of variables comprising a subset of explanatory variables.

An embodiment of the invention also relates to a method of execution of a decision policy contained in a decision tree obtained by execution of such a building method. This method is also called a method for the management of decisions between a central manager and at least one terminal within a distributed network architecture hierarchically organized in N levels, with N≧2, the central manager being included in a rank N level, the terminal being included in a rank 1 level.

In general, the method of building the decision tree relies on the following elements:

a set V of variables, each with a finite domain;

a set R of rules or constraints on these variables a deduction system based on rules or a system of satisfaction of constraints if the rules are expressed in the form of constraints capable of absorbing the rules R;

a subset Vi of V, called a set of explanatory variables (also called measurable variables or again inputs);

a subset Vo of V, disjoined from Vi, called a set of target variables (also called variables to be deduced or again outputs).

In the embodiment specific to mobility, the variables of Vi are those specifying the subscription of the terminal (measurable in the customer database), the network in which the terminal is currently situated, the quality of service that it obtains. The variables of Vo are those specifying whether the inter-cell handover must be done or not (a handover_required equal to <<true>> or <<false>>) and for each available access network whether this network is a possible candidate for the inter-cell handover or not (candidate_network(s) equal to "true" or "false").

As illustrated in the flow chart of FIG. 1, in one particular embodiment, the method of the invention for the building of the tree comprises the steps described in detail here below.

In a step 11, the set of rules is added to the deduction system. The deduction system reduces the fields of possible values of all the variables of V.

Then, if all the explanatory variables of Vi have not yet been processed (negative response to the question of the step 12), the procedure passes to the step 13 of choosing an explanatory variable v from among those of Vi. This step of choice is therefore iterated starting from a root node to go toward the leaf nodes. In a step 14, a new node of the tree is created, relying on the explanatory variable v. In a step 15, the deduction system determines the possible values of the explanatory variable v. In a step 16, an arc of the decision tree is created for each possible value of the explanatory variable v. In a step 17, for each of the possible values 'a' of the explanatory variable v: a new instance is created of the deduction system by adding the rule v=a (which will propagate new constraints on the possible values of the other variables); and the explanatory variable v of Vi is eliminated for the following steps, before returning to the step 11.

When all the explanatory variables of Vi have been processed (positive response to the question of the step 12), an embodiment of the invention passes to a step 18 of retrieval of the decision tree in its current non-finalized form. An embodiment of the invention then passes to a step 19 in which, for each arc of the decision tree, the deduction system computes the possible values of the target variables of Vo, and they are stored in a leaf of the decision tree. The end step is referenced 191.

The elements referenced 14a, 16a, 18a and 19a, joined by dashes to the steps 14, 16, 18 and 19 respectively, illustrate the state of the building of the tree as and when the bidding method is executed.

According to an embodiment of the invention, at each iteration of the choice step 13, an available explanatory variable is chosen at the level occupying the highest rank among the ranks of the levels at which the free explanatory variables are available i.e. not already chosen in a preceding iteration of the step 13). Thus, when it is gone through from the root node toward the leaf nodes, the decision tree comprises a sequence of N sets of nodes, a set of nodes of rank i, i∈{N, N−1 ... 1}, relying on explanatory variables available at the level of rank i.

The above-mentioned criterion of choice (the explanatory variable chosen is the variable (or one of the variables) available at the level occupying the highest rank among the ranks of the levels at which the free explanatory variables are available) is for example applied as follows.

With each of the explanatory variables of Vi, there is associated a value corresponding to the rank of the level of the architecture at which it is available. For example, the comprehensive or overall variables are associated with the smallest value —0— and the local variables at the terminal are associated with the highest value. Since the choice is arbitrary, it is also possible to envisage a variant in which the comprehensive variables are associated with the highest value. Several variables may be associated with the same value (which means that they are available in the same level of the architecture).

Then, during the step of choice, the choice of an explanatory variable v among those of Vi is done in taking account of the values associated with the explanatory variables. In the above-mentioned example, the explanatory variable chosen is a variable (one of the variables) associated with the smallest value among the set of values associated with the explanatory variables. Thus, the most comprehensive explanatory variables are chosen as a priority.

At output of the process, a tree is obtained whose nodes closest to the root of the nodes corresponding to the highest-level explanatory variables (parameters) and the nodes closest to the leaves correspond to the local explanatory variables (parameters). The leaves contain the values deduced from each of the target variables of Vo.

For example, in the context of the rules of mobility and with a three-level architecture (described here below with reference to FIG. 5), we have the following set Vi:

"Subscription" variable (value 0 (rank 3 level of the architecture), variable available at the core of the network).

"Current_network" variable (value 0 (rank 3 level of the architecture) variable available at the core of the network);

"Load_AP_wlan" variable" (value 1 (rank 2 level of the architecture) variable available in the WLAN access network);

"[umts]_availability" variable (value 2 (rank 1 level of the architecture), variable available at the terminal);

"[wlan]_availability" variable (value 2 (rank 1 level of the architecture), variable available at the terminal);

"QoS_required" variable(value 2 (rank 1 level of the architecture), variable available at the terminal);

"Current_quality" variable (value 2 (rank 1 level of the architecture), variable available at the terminal);

"WLAN_Quality variable" (value 2 (rank 1 level of the architecture), variable available at the terminal).

Figure 2:
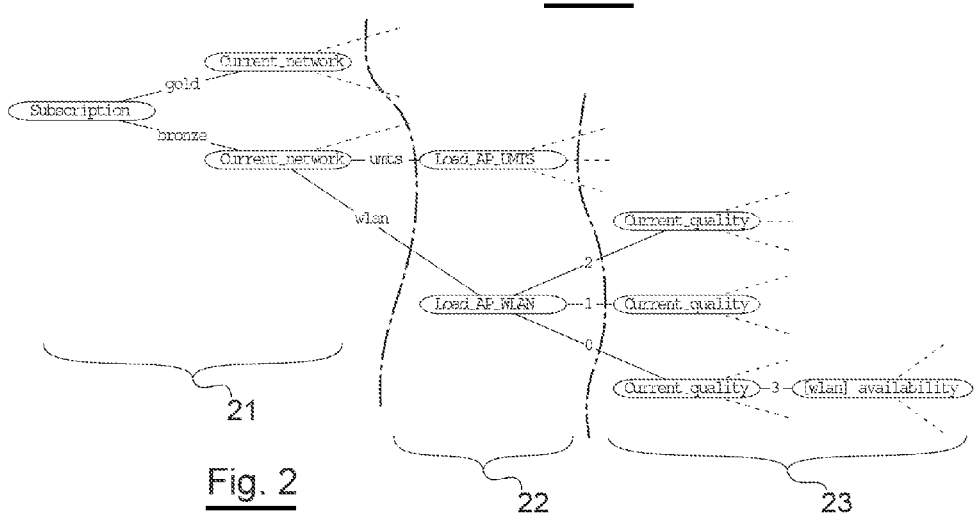
FIG. 2 is an example of a decision tree obtained by implementation of the building method of FIG. 1.

FIG. 2 presents an example of a decision tree obtained by application of the bidding method of FIG. 1, in the particular case of the management of mobility and with a three-level architecture.

A sequence of three sets of nodes can be seen, this sequence comprising:

a first set 21 of rank 3 nodes, relying on explanatory variables available at the rank 3 level of the architecture (overall or comprehensive level);

a second set 22 of rank 2, nodes relying on explanatory variables available at the rank 2 level of the architecture (intermediate level);

a third set 23 of rank 1 nodes, relying on explanatory variables available at the rank 1 level of the architecture (local level).

Figure 3:
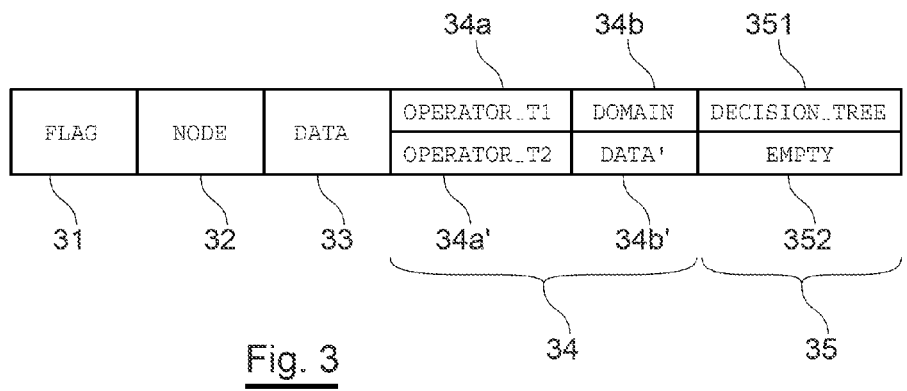
FIG. 3 is a generic representation of an elementary structure defining a node of a decision tree according to an embodiment of the invention, enabling the decision tree to be seen as a chained list of such elementary structures and thus enabling it to be transported.

Referring now to FIG. 3, we present an example of a distribution protocol of a decision tree obtained with the building method according to an embodiment of the invention.

The BNF (Backus Normal Form)grammar of the "handover decision tree" message (HDT) is the following:

```
HDT_MESSAGE ::=LIST_DECISION_TREE
LIST_DECISION_TREE::= (DECISION_TREE) *
DECISION_TREE::= FLAG NODE DATA (NEXT)*
FLAG ::= ROOT | ELEMENT | DECISION
NODE::= #LABEL
DATA::= #LABEL
NEXT ::= OPERATION (DECISION_TREE | VACANT)
OPERATION ::= (OPERATOR_T1 DOMAIN) | (OPERATOR _T2 DATA)
OPERATOR _T1 ::= IN | OUT
OPERATOR_T2 ::=  SMALLER  |  GREATER  |  EQUAL  | DIFFERENT |
SMALLER_OR_EQUAL | GREATER_OR_EQUAL
DOMAIN ::= DOMAIN_TYPE NUMBER_ELEMENTS (ELEMENT) +
DOMAIN_TYPE ::= BOOLEAN | NUMERICAL | SYMBOLIC
```

Thus, with the above BNF Grammar, a decision tree can be seen as a chained list of elementary structures, each defining a given node of the tree. Transporting the tree then simply consists in transmitting all the elementary structures of the chained list.

FIG. 3 is a generic representation of an elementary structure defining a given node. It comprises a flag 31, an identifier 32 of the elementary structure, at least one variable 33, an operation 34 to be made on each variable and a "next elementary structure" field 35.

The field 31 (called a <<FLAG>> in the BNF grammar here above) indicates whether, for the tree considered, the given node is a root node (the first node of the tree) (FLAG=ROOT), an intermediate node (FLAG=ELEMENT) or a decision node (FLAG=DECISION).

The identifier 32 of the elementary structure (called a "NODE" in the BNS grammar here above) is for example obtained by taking the content of the flag and, should the flag indicate "DECISION" or "ELEMENT", an order number for the type of flat concerned. Thus, we obtain, for example, identifiers such as: ROOT, ELEMENT 2, DECISION 5 ... (see appendices E and F discussed here below, wherein the first field indicated corresponds to the identifier of the elementary structure; for the sake of simplification, the flag field is not indicated in these appendices because it is taken up again in the identifier field).

The variable or variables 32 (called "DATA" in the BNF grammar here above) are the parameter or parameters that must be considered in this elementary structure. In the case of an explanatory variable, this may be the quality of a radio link, the availability of an interface of a terminal, etc.

For an explanatory variable, different values may lead to different directions in the decision tree. Thus, depending on the different values, it is possible to have two types of action: evaluating another explanatory variable or taking a final decision (obtaining the value of at least one target variable). The flag of an element indicates whether the manager is continuing to consider another parameter (FLAG=ELEMENT) or whether it is taking a decision (FLAG=DECISION).

The operation to 34 to be performed in each variable is for example defined: either with the combination of the "OPERATOR_T1" 34a and "DOMAIN" 34b, or the combination of the fields "OPERATOR_T2" 34a' and "DATA" 34b' (DATA' being another variable, with which the variable considered DATA is compared). The fields "DOMAIN", "OPERATOR_T1" and "OPERATOR_T2" may take different values depending on the variable ("DATA" (for example integer, chain of characters for the DOMAIN and >, <, =, in, out for the OPERATORS).

The "next elementary structure" fields 35 contains either the identifier of the elementary structure defining the next node of the tree (content 351 called "DECISION_TREE" in the BNF grammar mentioned here above) or an end indicator (content 352 called "EMPTY" in the BNF grammar here above).

The filling of the elementary structures can be summarized as follows.

If the given node is a root node, an intermediate mode or a decision node which is not a leaf node, the elementary structure comprises an explanatory variable (field referenced 33) and an operation to be made on the explanatory variable, constituting a test on the value of the explanatory variable (fields referenced 34). For each possible value of the test, the fields referenced 35 contain the identifier of the elementary structure defining the next node of the simplified tree ranked j−1. This is the case for example with the elementary structures "Root", "Decision 9", "Decision 10" and "Element 1" to "Element 8" in Appendix E.

If a given node is a decision node which is a leaf node, the elementary structure comprises at least one target variable and, for each target variable, an operation pertaining to the target variable, constituting the furnishing of a value of the target variable. For each target variable, the field referenced 35 contains the end indicator "Vacant". This is the case for example with the elementary structures "Decision 1" to "Decision 8" in appendix E.

Figure 4:
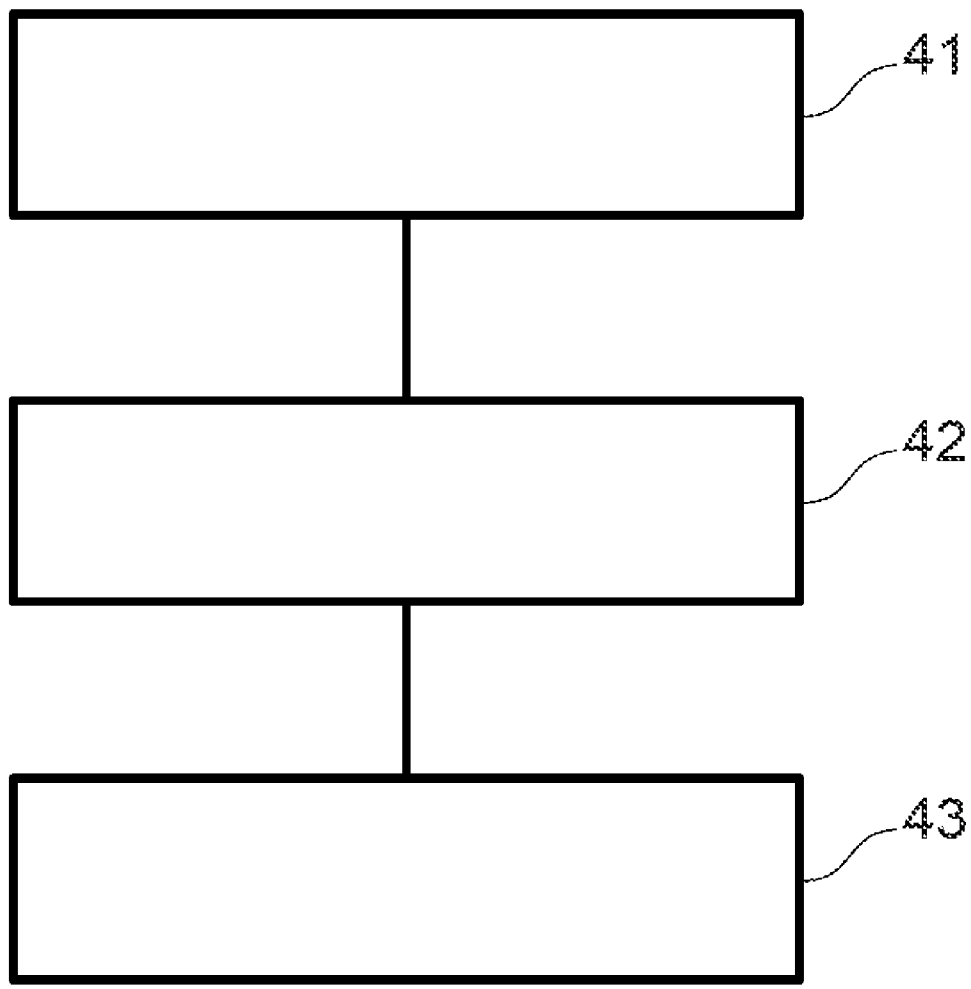
FIG. 4 is a flow chart of particular embodiment of the method of an embodiment of the invention for the execution of a decision policy contained in a decision tree obtained by implementation of the building method of FIG. 1.

Referring now to FIG. 4, we present a particular embodiment of the method according to the invention for the execution, within an architecture, of a decision policy contained in a distributable decision tree (or obtained by application of the building method of FIG. 1).

By way of an illustrative example, it is assumed that N=3, i.e. that the architecture is distributed and hierarchically organized in three levels. The rank 3 level, which is the most comprehensive level of the architecture, comprises the central manager which builds the complete decision tree, called a rank 3 tree. The rank 2 level comprises several parts each comprising an intermediate manager (of rank 2). The rank 1 level comprises the terminals.

For a given terminal, the method comprises the steps described here below. In a step 41, the central manager creates a simplified rank 1 tree out of simplified rank 2 decision tree then transmits it to the terminal. In a step 43, the terminal takes a decision on the basis of the simplified rank 1 tree and executes it.

It is clear that the invention is not limited to this particular embodiment.

It can be envisaged, while remaining in the context of the present invention, that the architecture is distributed and hierarchically organized in two levels. In this case, the central manager directly creates a simplified tree of rank 1 out of the complete decision tree, and then transmits it directly to the terminal so that the terminal takes a decision on the basis of this simplified rank 1 tree and executes it.

It is also possible to envisage an example where the architecture is distributed and hierarchically organized in more than three levels (N>3). In this case, each intermediate manager of a given rank transmits a simplified tree to the manager of the lower rank until this process reaches an intermediate manager of rank 2 which, for its part, transmits a simplified tree to the terminal. This can be summarized by the statement that the following steps are performed after initializing k at N−1:

a) the central manager transmits the simplified rank k tree to a rank k intermediate manager included in the rank k level;
b) the intermediate manager of rank k creates a simplified tree of rank k−1 out of the simplified tree of rank k;
c) if k≧3, the intermediate manager of rank k transmits the simplified tree of rank k−1 to an intermediate manager of rank k−1 included in the rank k−1 level, and the process returns to the step b) after having decremented k by one units;
if k=2, the intermediate manager of rank k transmits the simplified tree of rank k−1 to the given terminal, so that the given terminal takes a decision on the basis of the simplified tree of rank k−1 and executes it.

Figure 5:
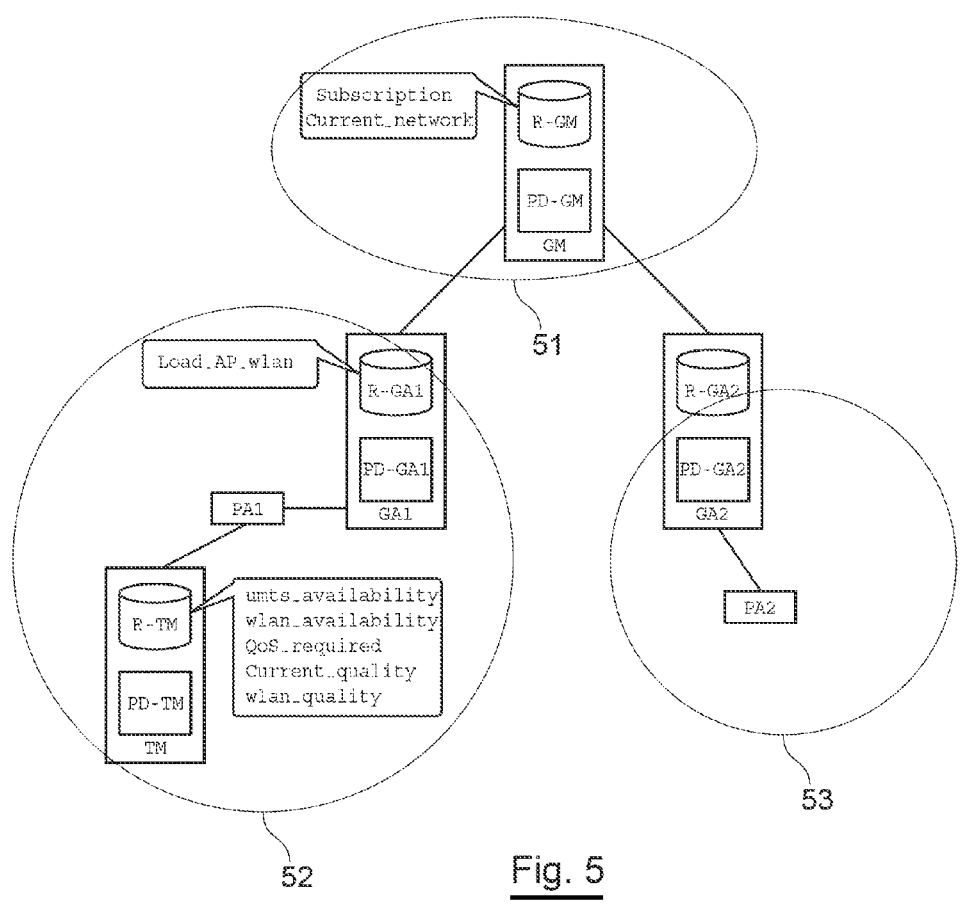
FIG. 5 shows an example of a three-level distributed architecture for the management of mobility within which an embodiment of the invention can be applied.
Figure 6A:
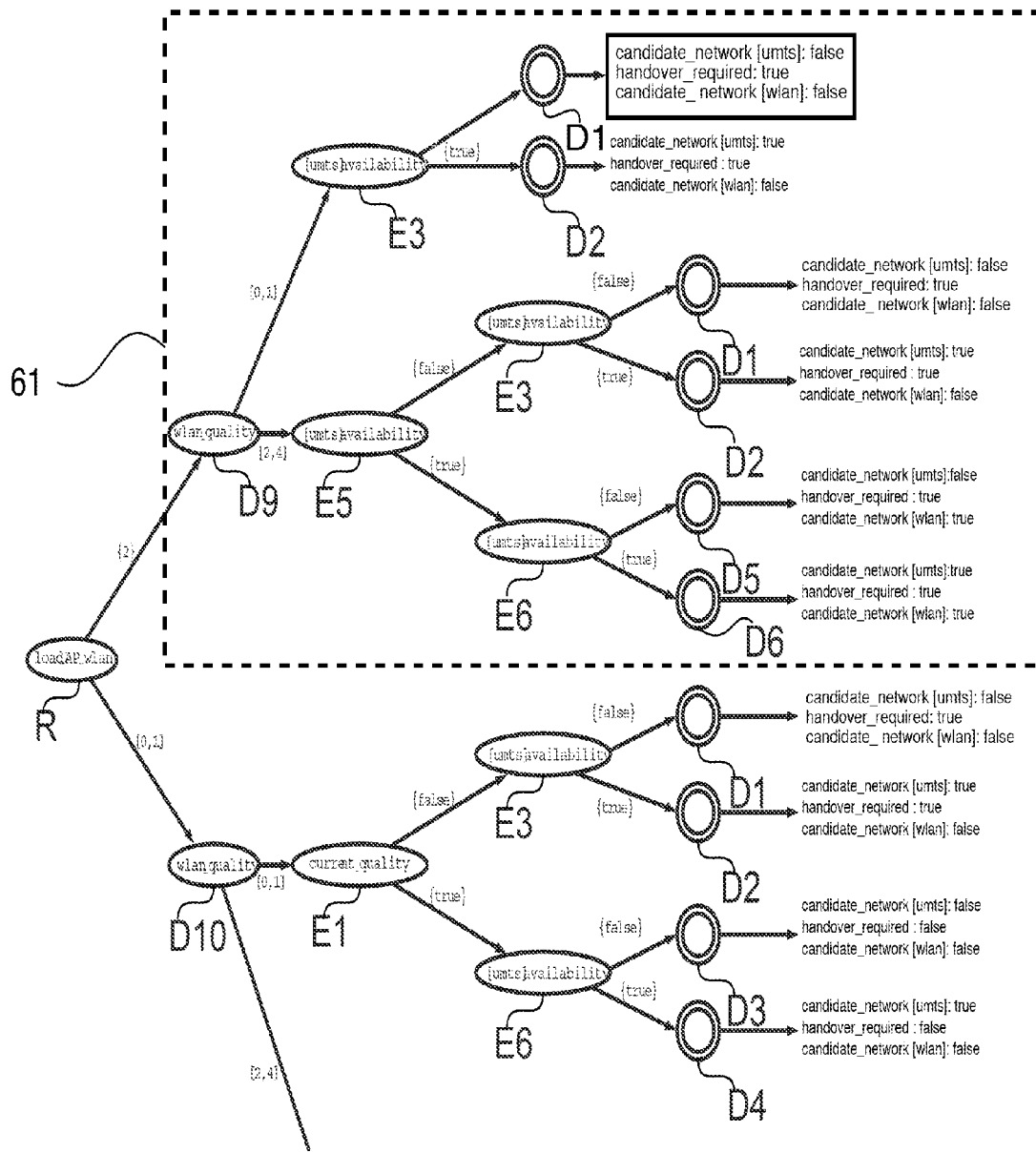
FIGS. 6*a* and 6*b* together show an example of a decision tree at a rank N−1 level.
Figure 6B:
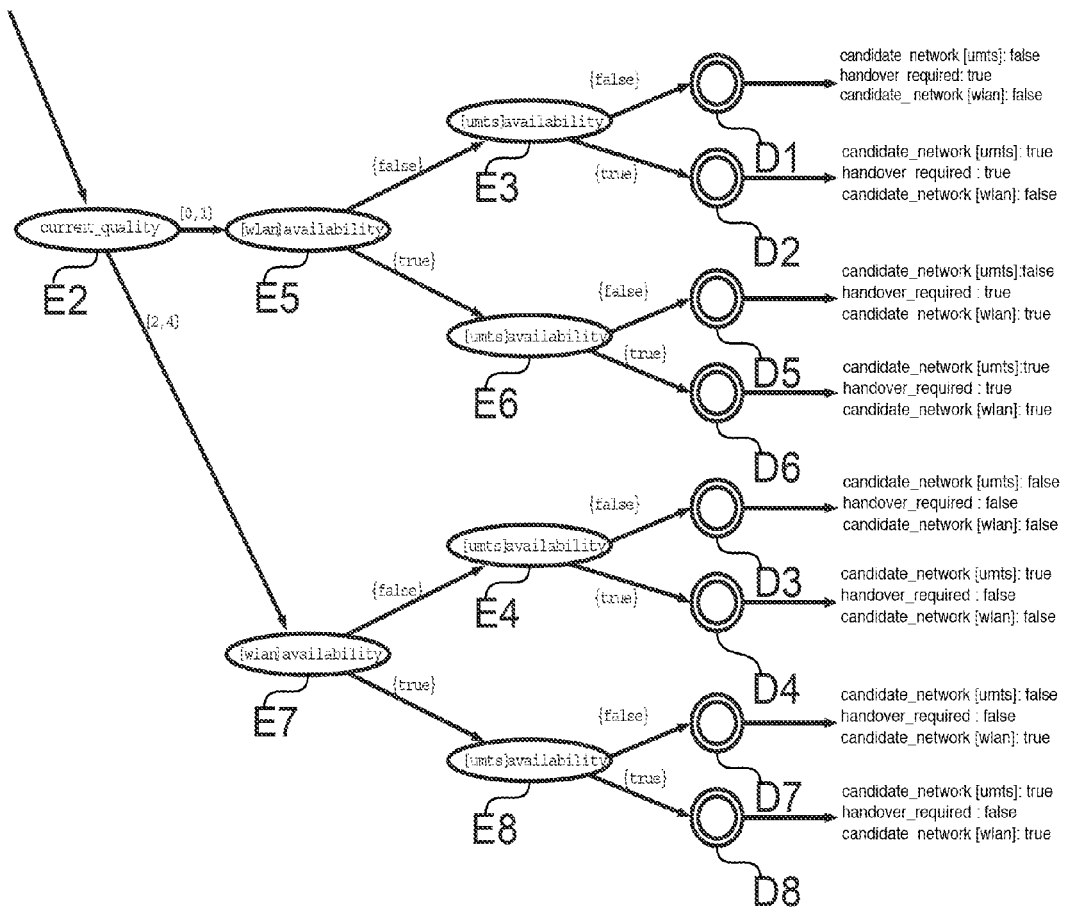
Figure 7:
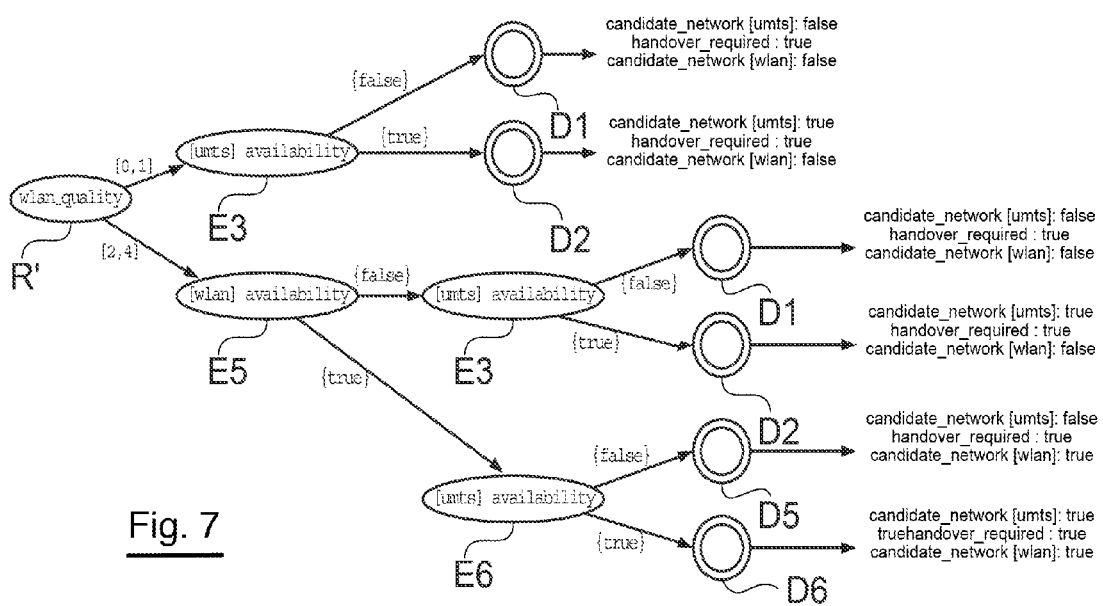
FIG. 7 shows an example of a decision tree at a rank N−2 level.

Referring now to FIGS. 5 to 7, a particular embodiment is presented of the two methods according to embodiments of the invention (method for building a distributable decision tree and corresponding method of execution, with distribution of the tree).

In the present description, the term inter-cell handover is applied to the passage of a mobile terminal from one access network to another access network which may or may not use the same technology. This inter-sent handover is decided and ordered by the central manager of mobility.

FIG. 5 presents an example of a distributed three-level architecture (N=3) for the management of mobility within which an embodiment of the invention can be applied.

This architecture comprises:
a rank 3 level comprising a core network 51 itself comprising a central manager of mobility GM;
a rank 2 level comprising two access networks 52, 53 (each access network forming a part of the rank 2 level). Each of the access networks itself comprises an access manager GA1, GA2; and
a rank 1 level comprising a plurality of mobile terminals. For the sake of simplification, only one mobile terminal TM is shown in FIG. 5.

The central manager of mobility GM comprises a decision point PD-GM which updates a database R-GM and prepares decision trees distributable as a function of the information stored in the database. The database R-GM of the central manager of mobility GM contains all the information needed for the implementation of the policy of management of mobility as well as the comprehensive and/or static data as defined for example in the Appendix A here below.

The access managers GA1, GA2 provide for connection towards the access networks 52, 53 via the core network 51. Each access manager GA1, GA2 comprises a decision point PD-GA1, PD-GA2 which implements the simplified decision trees received from the central manager of mobility in taking account of the local information stored in a database R-GA1, R-GA2. The database R-GA1, R-GA2 of an access manager GA1, GA2 contains local information of the access network 52, 53 concerned, as defined in Appendix B.

Access points PA1, PA2 provide for the attachment of the mobile terminals TM to an access manager GA1, GA2 and are connected to a router of an access network.

Each mobile terminal TM contains a decision point PD-TM and a database R-TM. The decision point PD-TM of a mobile telephone implements the simplified decision tree received from one of the access managers GA1, GA2 in taking account of local information stored in the database R-TM. The database R-TM of the terminal contains local information of the terminal as defined for example in the Appendix C.

In this architecture, the central mobility manager GM does not completely take the decision to perform an inter-cell handover for each terminal. The database of the central manager of mobility GM does not contain all the information pertaining to the terminals and to the access points belonging to specific access networks. On the contrary, the central manager of mobility GM has all the knowledge to prepare the decision trees for the management of the inter-cell handovers (the algorithm, the rules, the policies for inter-cell handover). These trees have been administratively accepted by all the member access networks. The database of the central manager of mobility GM contains static information (subscriptions, preferences etc) and overall information on the access networks.

The main task of the central manager of mobility GM is to consult its database to generate decision trees and distribute them to the access managers GA1, GA2 as a function of the location of the terminals (an access manager receives solely the simplified trees corresponding to the terminals that are located in its access network).

Each access manager has a decision point PD-GA1, PD-GA2 and a database R-GA1, R-GA2. the decision point contains the simplified decision treaties given by the central manager of mobility GM. The database R-GA1, R-GA2 contains the local information on the access network and certain information on the terminals present in the access network. The decision .point consults its database and follows these simplified decision trees. The result of this journey is transmitted to the mobile telephones. The decision .consult its database and follows the simplified decision trees. The result of this trouble is transmitted to the mobile telephones. This result may be either a simplified decision tree or an inter-cell handover decision.

Each terminal TM has a decision point PD-TM and a database R-TM. The decision point contains the decision tree or the decision given by one of the access managers GA1, GA2. The database R-TM contains the local information of the terminals. The decision .point PD-TM consults its database R-TM and follows the decision tree and executes the inter-cell handover decision.

A policy of mobility management can be represented by a set of rules chosen, for example, from among those listed in appendix D. The choice and the prioritization of certain of these rule (certain are exclusive) makes it possible to define an overall policy of mobility. A particular implementation applies, for example, a set of five rules (see rules 1 to 5 here below) which are converted into a decision tree by the building method defined by an embodiment of the invention (and implemented in a software program called COP (Compilateur and Optimiseur Propositionnel or propositional compiler and optimizer) which integrates its own deduction motor). The language of rules supported by the COP software has proved to be sufficient for an embodiment of the invention in the context of the mobility described herein. The final decision must state whether an inter-cell handover is required and if yes then to which access network. The access networks are, for example, a WLAN 52 and a UMTS network 53.

Rule 1: an access network is a candidate if it is available

Rule 2: a WLAN network is not a candidate if the quality perceived by the terminal toward the access point is lower than 2 on a scale of 1 to 5.

Rule 3: an inter-cell handover is necessary if the terminal is in a WLAN network and is a quality perceived by the WLAN is lower than 2 on a scale of 1 to 5.

Rule 3 an inter-cell handover is necessary if the terminal is in a WLAN network and if the quality perceived in the WLAN is lower than 2 on a scale of 1 to 5.

Rule 4: an inter-cell handover is necessary if the terminal is in a cell network and if the quality of service required is a WLAN QoS.

Rule 5: an inter-cell handover is necessary if the terminal is in a WLAN access network and if it has a non-priority subscription (below called a "bronze" subscription) as opposed to a "gold subscription" for a priority subscription) and if the load at the access point is equal to 2 on a scale of 1 to 5.

The complete tree (also called an N rank tree) corresponding to these rules, generated by the COP software, possesses 42 leaves and 124 nodes. It has a maximum depth of seven nodes.

We shall now present the formation of the N−1 rank trees. Using the principle described earlier, it is possible to reduce the N rank tree in taking account of two parameters (explanatory variables) at the level of the central manager of mobility GM. This is the subscription that is a static parameter known to the operator and the access network to which the terminal is connected. This parameter is sent back to the central manager of mobility GM by the terminals TM at the time of powering on and at each change of access network 52,53. Thus, the central mobility manager can compute simplified decision trees proper to the terminals.

Four simplified trees (also called reduced trees) of rank N−1 are for example obtained:

if we have a terminal whose subscription is a bronze subscription and whose current access network is the WLAN, then a first reduced tree of rank N−1 with 18 leaves and a depth of 5 is obtained;

for a bronze subscription and a UMTS current access network, a second reduced tree of N−1 rank with 12 leaves and a depth of 4 is obtained;

for a gold subscription and a WLAN current access network, a third reduced tree of N−1 rank with 12 leaves and a depth of 4 is obtained;

for a gold subscription and a UMTS current access network, in fourth reduced tree of N−1 rank with 12 leaves and a depth of 4 is obtained.

It is these reduced trees of N−1 rank that are transmitted to the access managers GA1, GA2.

By way of an example, details are given in Appendix E of the messages which, on the basis of the notion of an elementary structure described here above with reference to FIG. 3, describe the first reduced tree of N−1 rank (bronze subscription and WLAN current access network).

FIGS. 6a and 6b together illustrate this first reduced tree of rank N−1. In FIGS. 6a and 6b, the first reduced tree of rank N−1, comprising 35 nodes (of which one is a root node and 18 are leaf nodes) is described with only the following 19 elementary structures:

one elementary structure (whose identifier is "Root" in appendix F) defining a root node referenced R;

eight elementary structures (whose identifiers are "Element 1" to "Element 8" in appendix E) defining intermediate nodes referenced E1 to E8; and ten elementary structures (whose identifiers are "Decision 1" to "Decision 10" in appendix E) defining decision nodes referenced D1 to D10 (of which those referenced D1 to D8 are leaf nodes).

It is possible to use a limited number of elementary structures (smaller than the number of nodes to be defined) owing to the fact that several nodes are defined with a same elementary structure. For example, three nodes E3 are defined with the same elementary structure whose identifier is "Element 3".

The formation of the trees of rank N−2 shall now be presented. Using the principle described here above again, it is possible to reduce a tree of rank N−1 in taking account of parameter (explanatory variable) at the level of one of the access managers GA1, GA2. For the access manager GA1, this is the load parameter ("load_AP_wlan"). Depending on this parameter, the access manager takes a decision on change of access network or else sends the terminal a reduced tree of rank N−2.

By way of an example, details are given in Appendix F of the messages which, on the basis of the notion of an elementary structure described here above with reference to FIG. 3, describes the reduced tree of rank N−2 corresponding to the case where the variable "load_AP_wlan" takes the value 2.

FIG. 7 illustrates this reduced tree of rank N−2, which corresponds to a part of the tree of rank N−1 of FIGS. 6a and 6b. This part is referenced 61 in FIGS. 6a and 6b. In this FIG. 7, the reduced tree of rank N−2, which comprises 11 nodes (of which one is a root node and six are leaf nodes) is described with only the following eight elementary structures:

one elementary structure (whose identifier is <<both>> and elementary structure (whose identifier is "Root" in appendix F) defining a root node referenced R';

three elementary structures (whose identifiers are <<Element 3>>, <<Element 5>> and "Element 6" in appendix E) defining intermediate nodes referenced E3, E5 and E6; and four elementary structures (whose identifiers are <<Decision 1>>, <<Decision 2>>, "Decision 5" and "Decision 6" in appendix E) defining decision nodes referenced D1, D2, D5 and D6 (which are all leaf nodes). When it receives a reduced tree of rank N−2, the terminal evaluates the local parameters (explanatory variables) ("wlan_quality", "UMTS_availability" and "wlan_availability") and takes the final decision.

Figure 8:
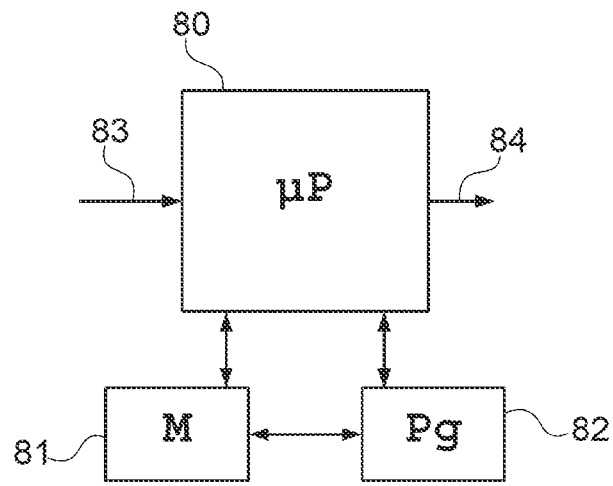
FIG. 8 shows the structure of a central manager according to an embodiment of the invention.

FIG. 8 presents the structure of the central manager according to an embodiment of the invention, comprising a memory M 81 and a processing unit 80 equipped with a microprocessor μP, which is driven by a computer program (or application) Pg 82. The processing unit 80 receives all the information 83 necessary for the application of a decision policy (for example a mobility management policy), which the microprocessor μP processes, according to the instructions of the program Pg 82, to generate simplified trees 84 which are transmitted to intermediate managers (case N>2) or to terminals (case N=2).

Figure 9:
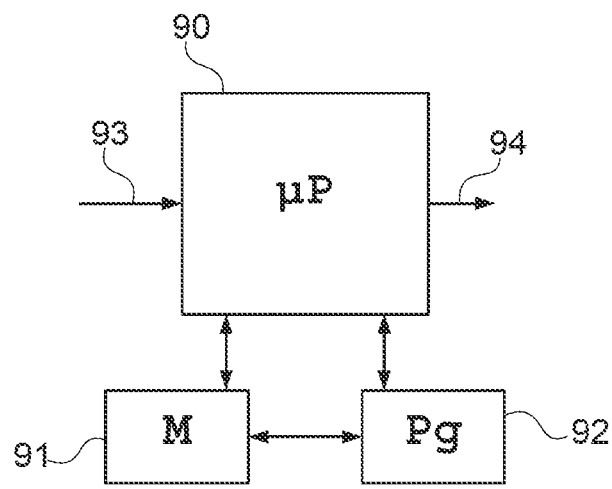
FIG. 9 shows a structure of an intermediate manager according to an embodiment of the invention.

FIG. 9 presents the structure of an intermediate manager according to an embodiment of the invention, comprising a memory M 91 and a processing unit 90 equipped with a microprocessor μP, which is driven by a computer program (or application) 92. The processing unit 90 receives simplified trees coming from the manager of higher rank (central manager or any other intermediate manager) which the microprocessor μP processes according to the instructions of the program Pg 92, to generate simplified trees 94, which are transmitted to intermediate managers of lower rank of the terminals, depending on the position of the intermediate manager considered within the hierarchically organized architecture.

Figure 10:
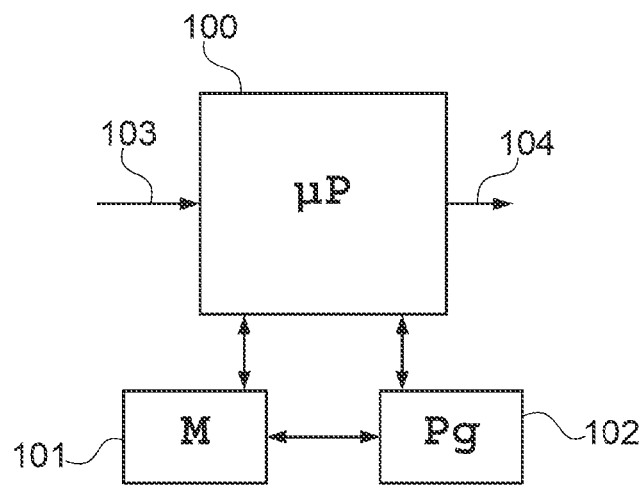
FIG. 10 shows the structure of a terminal according to an embodiment of the invention.

FIG. 10 presents the structure of a terminal according to an embodiment of the invention, comprising a memory M 101 and a processing unit 100 equipped with a microprocessor μP, which is driven by a computer program (or application) 102. The processing unit 100 receives simplified trees coming from the manager of higher rank (central manager or any other intermediate manager) which the microprocessor μP processes according to the instructions of the program Pg 102, to take a decision and execute it. The result of this execution is symbolized by the arrow referenced 104.

The present disclosure provides a technique for building a decision tree containing a decision policy to be implemented within a distributed and hierarchically organized architecture, as well as a technique for the use of this decision tree to execute the decision policy that it contains, these two techniques enabling the optimizing of the implementation of the decision policy.

The disclosure provides such techniques that are simple to implement and cost little.

The disclosure, in the particular case of decision policy on mobility within a network architecture, provides such techniques to optimize the management of the mobility of the terminals, especially in reducing the time taken to carry out the inter-cell handovers.

Appendix A: Overall Data Situated in the Base of the GM

| Name of the DATA | Definition |
| --- | --- |
| Current_ani | Identification of the current access network of a mobile terminal |
| Technology type | Characterizes the technology of the access network |
| Resource type | Characterizes the type of radio resources of an access network |
| Cell size | Characterizes the size of the radio cells of an access network |
| Cost | Characterizes the cost of an access network for the customer |
| Yield | Characterizes the yield of an access network for the operator |
| Security | Characterizes the level of security that an access network may offer |
| Overall load | Indicates the overall load of an access network |
| Class | Indicates the type of subscription of a customer |
| Barred ANI | Indicates the networks barred by customer |
| Authentication status | Indicates the authentication status of a customer |
| Autorisation_status | Indicates the authorization status of the customer |

Appendix B: Data Local to the Access Networks Situated in the Bases of the GA

| Name of the DATA | Definition |
| --- | --- |
| Available | Indicates current availability of an access point |
| Load | Indicates current load of an access point |
| Resource used | Indicates use of resources for each class of subscribers |
| QoS achievable | Indicates quality of service that can be provided to a new terminal at an access point |
| QoS served | Indicates the quality of service provided to an application |

-continued

| Name of the DATA | Definition |
|---|---|

Appendix C: Data Local to the Terminal Situated in the Data Base of the Terminal.

| Name of the DATA | Definition |
|---|---|
| Preferred ANI | Identifies customer's preferred access network |
| Security_level | Indicates the security level desired by the customer |
| Speed | Indicates the speed of the terminal |
| Availability | Indicates the availability of an access point as seen from a terminal |
| Link quality | Indicates the quality of the link to an access network |
| Priority | Indicates the priority of an application |
| QoS required | Indicates the quality of service required for an application |
| QoS acceptable | Indicates the quality of service acceptable for an application |
| Service_level | Indicates the service chosen by the customer |

Appendix D: Example of Rules Applied in a Mobility Management Policy

Prohibit inter-cell handover operations to barred access networks

When an access point becomes unavailable, carry out inter-cell handover for all the terminals that at this access point When the quality on an access network becomes inadequate, carry out inter-cell handover to another available access network When the load at an access point becomes excessive, carry out inter-cell handover of terminals having a lower-level subscription.

When the load at an access point becomes excessive, carry out an inter-cell handover of lower priority applications.

Carry out an inter-cell handover of high-speed terminals to access networks of large cell size Bar inter-cell handover of high-speed terminals to access networks with small cell size Place security level required by applications in concordance with the security level offered by the access networks When the quality of service requested by an application is higher than the quality of service offered by the access network and when the quality of service available on another access network is higher, then carry out inter-cell handover of the application to this access network Carry out an inter-cell handover of applications when an access network offering better yield comes unavailable Carry out inter-cell transfer of all the applications of customer to his or her preferred access network Carry out inter-cell handover of applications to least loaded access network Carry out inter-cell handover of all the applications of a customer to his or her preferred access network Carry out an inter-cell transfer of an application to the least expensive access network.

Appendix E: Messages (Elementary Structures) that Describe the First Reduced Tree of N−1 Rank (Bronze Subscription and WLAN Current Access Network)

| Root | Load_AP_wlan | in | {2} | Decision 9 |
|---|---|---|---|---|

-continued

| | | in | {0; 1} | Decision 10 |
|---|---|---|---|---|
| Decision 9 | wlan_quality | in | {0; 1} | Element 3 |
| | | in | [2, 4] | Element 5 |
| Decision 10 | wlan_quality | in | {0; 1} | Element 1 |
| | | in | [2, 4] | Element 2 |
| Element 1 | Current_quality | in | [2, 4] | Element 4 |
| | | in | {0; 1} | Element 3 |
| Element 2 | Current_quality | in | [2, 4] | Element 7 |
| | | in | {0; 1} | Element 5 |
| Element 3 | UMTS_availability | in | {false} | Decision 1 |
| | | in | {true} | Decision 2 |
| Element 4 | UMTS_availability | in | {false} | Decision 3 |
| | | in | {true} | Decision 4 |
| Element 5 | wlan_availability | in | {false} | Element 3 |
| | | in | {true} | Element 6 |
| Element 6 | UMTS_availability | in | {false} | Decision 5 |
| | | in | {true} | Decision 6 |
| Element 7 | wlan_availability | in | {false} | Element 4 |
| | | in | {true} | Element 8 |
| Element 8 | UMTS_availability | in | {false} | Decision 7 |
| | | in | {true} | Decision 8 |
| Decision 1 | Candidate_network[umts] | in | {false} | empty |
| | Handover_required | in | {true} | empty |
| | Candidate_network[wlan] | in | {false} | empty |
| Decision 2 | Candidate_network[umts] | in | {true} | empty |
| | Handover_required | in | {true} | empty |
| | Candidate_network[wlan] | in | {false} | empty |
| Decision 3 | Candidate_network[umts] | in | {false} | empty |
| | Handover_required | in | {false} | empty |
| | Candidate_network[wlan] | in | {false} | empty |
| Decision 4 | Candidate_network[umts] | in | {true} | empty |
| | Handover_required | in | {false} | empty |
| | Candidate_network[wlan] | in | {false} | empty |
| Decision 5 | Candidate_network[umts] | in | {false} | empty |
| | Handover_required | in | {true} | empty |
| | Candidate_network[wlan] | in | {true} | empty |
| Decision 6 | Candidate_network[umts] | in | {true} | empty |
| | Handover_required | in | {true} | empty |
| | Candidate_network[wlan] | in | {true} | empty |
| Decision 7 | Candidate_network[umts] | in | {false} | empty |
| | Handover_required | in | {false} | empty |
| | Candidate_network[wlan] | in | {false} | empty |
| Decision 8 | Candidate_network[umts] | in | {true} | empty |
| | Handover_required | in | {false} | empty |
| | Candidate_network[wlan] | in | {true} | empty |

Appendix F: Messages (Elementary Structures) that Describe the Reduced Tree of Rank N−2 Corresponding to the Case where the <<Load_AP_wlan>> Takes the Value 2.

| Racine | Qualite_wlan | in | {0; 1} | Element 3 |
|---|---|---|---|---|
| | | in | [2, 4] | Element 5 |
| Element 3 | UMTS_availability | in | {false} | Decision 1 |
| | | in | {true} | Decision 2 |
| Element 5 | wlane_availability | in | {false} | Element 3 |
| | | in | {true} | Element 6 |
| Element 6 | UMTS_availability | in | {false} | Decision 5 |
| | | in | {true} | Decision 6 |
| Decision 1 | Candidate_network[umts] | in | {false} | Empty |
| | Handover_required | in | {true} | Empty |
| | Candidate_network[wlan] | in | {false} | Empty |
| Decision 2 | Candidate_network[umts] | in | {true} | Empty |
| | Handover_required | in | {true} | Empty |
| | Candidate_network[wlan] | in | {false} | Empty |
| Decision 5 | Candidate_network[umts] | in | {false} | Empty |
| | Handover_required | in | {true} | Empty |
| | Candidate_network[wlan] | in | {true} | Empty |
| Decision 6 | Candidate_network[umts] | in | {true} | Empty |
| | Handover_required | in | {true} | Empty |

The invention claimed is:

1. Method of management of decisions between central manager equipment and at least one terminal equipment within a network architecture distributed and hierarchically organized in N levels with N≧2, the central manager equipment being included in a rank N level, said at least one terminal equipment being included in a rank 1 level, wherein the method comprises a step of distribution of a decision tree built by the central manager equipment and relying on said architecture, the step of distribution of the decision tree itself comprising the following steps, for a given terminal equipment:

from the decision tree, called a rank N tree, the central manager equipment creates a simplified tree of rank N−1;

if N=2, the central manager equipment transmits the simplified tree of rank N−1 to the given terminal equipment so that the given terminal equipment takes a decision on the basis of the simplified tree of rank N−1 and executes the decision;

if N≧3, the following steps are performed, after k has been initialized at N−1:

a) the central manager equipment transmits the simplified tree of rank k to intermediate manager equipment of rank k included in the rank k level;

b) the intermediate manager equipment of rank k creates a simplified tree of rank k−1 from the simplified tree of rank k;

c) if k≧3, the intermediate manager equipment of rank k transmits the simplified tree of rank k−1 to an intermediate manager equipment of rank k−1 included in the level of rank k−1 and the process returns to the step b) after having decremented k by one unit;

if k=2, the intermediate manager equipment of rank k transmits the simplified tree of rank k−1 to the given terminal equipment, so that the given terminal equipment takes a decision on the basis of the simplified tree of rank k−1 and executes the decision.

2. Method according to claim 1, wherein if, in the step b), the simplified tree of rank k−1 is reduced to a leaf node, then the step c) is replaced by the following step:

c') the intermediate manager equipment of rank k takes a decision and transmits the decision to the given terminal equipment so that the given terminal equipment executes the decision.

3. Method according to claim 1, wherein the transmission of a simplified tree of rank j−1 by a rank j manager with j∈{N . . . 2}, is based on an overall simplified tree structure comprising a chained list of elementary structures each defining a given node of the simplified tree of rank j−1 and each comprising:

a flag indicating whether, for the simplified tree of rank j−1, the given node is a root node, an intermediate node or a decision node;

an identifier of the elementary structure;

if the given node is a root node, an intermediate mode or a decision node that is not a leaf node:
an explanatory variable;
an operation to be performed on the explanatory variable, constituting a test on the value of the explanatory variable;
for each possible value of the test, a "following elementary structure" field containing the identifier of the elementary structure defining the following node of the simplified tree of rank j−1;

if the given node is a decision node that is the leaf node:
at least one target variable;
for each target variable, an operation on the target variable constituting the supply of a value of the target variable;

for each target variable, a "following elementary structure" containing an end indicator.

4. Method according to claim 1 wherein the decision tree comprises, when the decision tree has gone through from a root node toward leaf nodes, a sequence of N sets of nodes, a set of nodes of rank i, i∈{N . . . 1}, relying on explanatory variables available at the level of rank i, and wherein the creation by a rank j manager of a simplified tree of rank j−1 on from a rank j tree, with j∈{N . . . 2}, is done in taking account of at least one piece of information that the rank j manager possesses on at least one explanatory variable available at the rank j level, and wherein when the decision tree reaches a node of the set of rank j−1 nodes in going through the rank j tree, the rank j manager transfers control to a rank j−1 manager so that the rank j−1 manager goes through the simplified tree of rank j1 .

5. Method according to claim 1, wherein the transmission of a simplified tree of rank j−1 to a rank j−1 manager, with j∈{N . . . 2}, is done by the rank j manager in a preliminary step of distribution of all the rank j−1 trees possible between all the rank j−1 managers.

6. Method according to claim 1, wherein the decision tree, when the decision tree has gone through from a root node toward leaf nodes, comprises a sequence of N sets of nodes, a set of nodes of rank i, i∈{N . . . 1}, relying on explanatory variables available at the level of rank i, and wherein the transmission of a simplified tree of rank j−1 to a rank j−1 manager, with j∈{N . . . 2}, is done by the rank j manager only after the rank j manager has arrived, in going through a rank j tree on one node of a set of rank j−1 nodes.

7. Method according to claim 1, wherein the decision tree contains a decision policy belonging to the group comprising:
decision policies on mobility of said at least one terminal equipment within the network architecture;
decision policies on quality of service for said at least one terminal equipment within the network architecture; and
decision policies on security for said at least one terminal equipment within the network structure.

8. Method according to claim 1, wherein the method comprises:

a step, performed by the central manager equipment for determining a decision tree on the basis of a set of rules defining a decision policy to be applied within said network and a set of variables comprising a subset of explanatory variables, said determining step comprising a step of choosing an explanatory variable so as to create a new node of the tree relying on said explanatory variable, the step of choice being iterated starting from a root node and going towards leaf nodes, the choice made at each new iteration being made from among the explanatory variables, called free explanatory variables, not already chosen during a preceding iteration, wherein at each iteration of the step of choosing, an available explanatory variable is chosen at the level occupying the highest rank among the ranks of the levels at which the free explanatory variables are available, so that the decision tree comprises, when the decision tree has gone through from the root node to the leaf nodes, a sequence of N sets of nodes, a set of nodes of rank i, i∈{N . . . 1}, relying on explanatory variables available at the rank i level.

9. Method according to claim 8, wherein the decision policy belongs to the group comprising:
decision policies on mobility of said at least one terminal equipment within the network architecture;

decision policies on quality of service for said at least one terminal equipment within the network architecture; and
decision policies on security for said at least one terminal equipment within the network structure.

10. Method according to claim 8, wherein the decision policy is a decision policy on mobility of said at least one terminal equipment within the network architecture, and the architecture is hierarchically organized according to the following three levels:
a rank 3 level comprising a core network;
a rank 2 level comprising at least two access networks each forming a part of the rank 2 level;
a rank 1 level comprising a plurality of terminal equipment each forming a part of the rank 1 level.

11. Method according to claim 10, wherein the subset of explanatory variables comprises:
at least one variable available at the rank 3 level and belonging to the group comprising:
a variable defining the type of subscription associated with the terminal equipment;
a variable defining the access network to which the terminal equipment is connected;
at least one variable available at the rank 2 level for each access network and belonging to the group comprising:
a variable defining the load of a point of access to the access network;
at least one variable available at the rank 1 level for each terminal equipment connected to a given access network, and belonging to the group comprising:
for each access network, a variable defining the availability of the access network;
a variable defining the quality of service required by the terminal equipment;
a variable defining the quality of service offered to the terminal equipment; and
a variable defining the quality of surface offered by the given access network.

12. Method of partial processing of a decision tree by central manager equipment, in the context of management of decisions between the central manager equipment, which comprises a memory and a processing unit, and at least one terminal equipment, which comprises a memory and a processing unit, within a network architecture distributed and hierarchically organized in N levels with $N \geq 2$, the central manager equipment comprising a memory and a processing unit and being included in a level of rank N, said at least one terminal equipment being included in a rank 1 level, wherein the central manager equipment performs the following steps, for a given terminal equipment:
from the decision tree, called a rank N tree, the central manager equipment creates a simplified tree of rank N−1;
if N=2, the central manager equipment transmits the simplified tree of rank N−1 to the given terminal equipment so that the given terminal equipment takes a decision on the basis of the simplified tree of rank N−1 and executes the decision;
if $N \geq 3$, the central manager equipment transmits the simplified tree of rank N−1 to intermediate manager equipment of rank N−1, which comprises a memory and a processing unit, included in the rank N−1 level so that the given terminal equipment receives a simplified rank 1 tree via a cascade of intermediate manager equipment comprising at least the intermediate manager equipment of rank N−1.

13. Method according to claim 12, wherein the central manager equipment performs a preliminary step of building the decision tree from a set of rules defining a decision policy to be applied within said architecture and a set of variables comprising a subset of explanatory variables, the building step comprising a step of choice of an explanatory variable so as to create a new node of the tree relying on said explanatory variable, the step of choice being iterated starting from a root node and going towards leaf nodes, the choice made at each new iteration being made from among the explanatory variables, called free explanatory variables, not already chosen during a preceding iteration, and wherein, at each iteration of the step of choice, the central manager equipment chooses an explanatory variable available at the level occupying the highest rank among the ranks of the levels at which the free explanatory variables are available, so that the decision tree comprises, when the decision tree has gone through from the root node to the leaf nodes, a sequence of N sets of nodes, a set of nodes of rank i, $i \in \{N \ldots 1\}$, relying on explanatory variables available at the rank i level.

14. Method of partial processing of a decision tree by intermediate manager equipment of rank m, with $m \in \{N-1 \ldots 2\}$, which comprises a memory and a processing unit, in the context of the management of decisions between central manager equipment, which comprises a memory and a processing unit, and at least one terminal equipment, which comprises a memory and a processing unit, within a network architecture distributed and hierarchically organized hierarchically organized in N levels with $N \geq 3$, the central manager equipment being included in a level of rank N, said at least one terminal equipment being included in a rank 1 level, wherein the intermediate manager equipment performs the following steps, for a given terminal equipment:
it receives a simplified tree of rank m;
from the simplified tree of rank m, the intermediate manager equipment creates a simplified tree of rank m−1;
if m=2, the intermediate manager equipment transmits the simplified tree of rank M−1 to the given terminal equipment so that the given terminal equipment takes a decision on the basis of the simplified tree of rank m−1 and executes the decision;
if $m \geq 3$, the intermediate manager equipment transmits the simplified tree of rank m−1 to intermediate manager equipment of rank m−1 included in the m−1 rank level, so that the given terminal equipment receives a simplified tree of rank 1 via a cascade of intermediate manager equipment comprising at least the intermediate manager equipment of rank m−1.

15. Method according to claim 14, wherein, if the simplified tree of rank m−1 is reduced to a leaf node, then the intermediate manager equipment takes a decision and transmits the decision to the given terminal equipment so that the given terminal equipment executes the decision.

16. Method of partial processing of a decision tree performed by terminal equipment, which comprises a memory and a processing unit, in the context of the management of decisions between central manager equipment, which comprises a memory and a processing unit, and at least one terminal equipment, within a network architecture distributed and hierarchically organized in N levels with $N \geq 2$, the central manager equipment being included in a level of rank N, said one terminal equipment being included in a level of rank 1, wherein the terminal equipment performs the following steps:
the terminal equipment receives a simplified tree of rank 1;
the terminal equipment takes a decision on the basis of the simplified tree of rank 1 and executes the decision.

17. A non-transient computer-readable medium comprising program code instructions stored thereon for execution of the steps of the method according to claim 12 for partial processing of a decision tree by central manager equipment, when said program is executed on a computer.

18. A non-transient computer-readable medium comprising program code instructions stored thereon for execution of the steps of the method according to claim 14 for partial processing of a decision tree by intermediate manager equipment, when said program is executed on a computer.

19. A non-transient computer-readable medium comprising program code instructions stored thereon for execution of the steps of the method according to claim 16 for partial processing of a decision tree by terminal equipment, when said program is executed on a computer.

20. Central manager equipment enabling the partial processing of a decision tree in the context of the management of decisions between the central manager equipment and at least one terminal equipment within a network architecture distributed and hierarchically organized in N levels with $N \geq 2$, the central manager equipment being included in a level of rank N, said at least one terminal equipment being included in a level of rank 1, wherein the central manager equipment comprises:

means for creation, for a given terminal equipment, of a simplified tree of rank N−1 from the decision tree called a tree of rank N;

first means for transmission of the simplified tree of rank N−1 to the given terminal equipment, used when N=2, so that the given terminal equipment takes a decision on the basis of the simplified tree of rank N−1 and executes the decision;

second means for transmission of the simplified tree of rank N−1 to intermediate manager equipment of rank N−1 included in the rank N−1 level, used when $N \geq 3$, so that the given terminal equipment receives a simplified rank 1 tree via a cascade of intermediate manager equipment comprising at least the intermediate manager of rank N−1.

21. Central manager equipment according to claim 20, wherein the central manager equipment comprises means for building a decision tree on the basis of a set of rules defining a decision policy to be applied within said architecture, the means for building using a subset of explanatory variables, the means for building comprising means for choosing an explanatory variable so as to create a new node of the tree relying on said explanatory variable, the means for choosing being used iteratively, starting from a root node and going towards leaf nodes, the choice made at each new iteration being made from among the explanatory variables, called free explanatory variables, not already chosen during a preceding iteration and wherein, at each iteration, the means for choosing choose an available explanatory variable at the level occupying the highest rank among the ranks of the levels at which the free explanatory variables are available, so that the decision tree comprises, when the decision tree has gone through from the root node to the leaf nodes, a sequence of N sets of nodes, a set of nodes of rank i, $i \in \{N \ldots 1\}$, relying on explanatory variables available at the rank i level.

22. Intermediate manager equipment of rank m, with $m \in \{N-1 \ldots 2\}$, enabling the partial processing of a decision tree in the context of the management of decisions between central manager equipment and at least one terminal equipment within a network architecture distributed and hierarchically organized in N levels with $N \geq 3$, the central manager equipment being included in a level of rank N, said at least one terminal equipment being included in a rank 1 level, wherein the intermediate manager equipment comprises:

means for reception, for a given terminal equipment, of a simplified tree of rank m;

means for creation of a simplified tree of rank m−1 from the simplified tree of rank m;

first means for transmission of the simplified tree of rank m−1 to the given terminal equipment, used when N=2, so that the given terminal equipment takes a decision on the basis of the simplified tree of rank m−1 and executes the decision;

second means for transmission of the simplified tree of rank m−1 to an intermediate manager equipment of rank m−1 included in the m−1 rank level, used when $N \geq 3$, so that the given terminal equipment receives a simplified tree of rank 1 via a cascade of intermediate manager equipment comprising at least the intermediate manager equipment of rank m−1.

23. Intermediate manager equipment according to claim 22, wherein the intermediate manager equipment further comprises:

means for taking a decision, activated if the simplified tree of rank m−1 is reduced to a leaf node; and means for transmission of the decision made to the given terminal equipment, so that the given terminal equipment executes the decision.

24. Terminal equipment comprising:

a memory;

a program stored in the memory; and a processor, which receives a simplified tree of rank 1 representing a decision tree in context of management of decisions between central manager equipment and at least said terminal equipment, within a network architecture distributed and hierarchically organized in N levels with $N \geq 2$, the central manager equipment being included in a level of rank N, and the terminal equipment being included in a level of rank 1, wherein the processor processes instructions of the program stored in the memory to take a decision on the basis of the simplified tree of rank 1 and executes the decision taken.

\* \* \* \* \*